United States Patent
Boivin et al.

(10) Patent No.: US 11,136,462 B2
(45) Date of Patent: *Oct. 5, 2021

(54) PROCESS FOR THE PREPARATION OF PRECIPITATED SILICAS, PRECIPITATED SILICAS AND THEIR USES, IN PARTICULAR FOR THE REINFORCEMENT OF POLYMERS

(71) Applicant: RHODIA OPERATIONS, Paris (FR)

(72) Inventors: Cédric Boivin, Chasselay (FR); Laurent Guy, Rillieux-la-Pape (FR); Eric Perin, Villefranche sur Saône (FR); Kilani Lamiri, L'Arbresle (FR)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/118,674

(22) PCT Filed: Feb. 12, 2015

(86) PCT No.: PCT/EP2015/052911
§ 371 (c)(1),
(2) Date: Aug. 12, 2016

(87) PCT Pub. No.: WO2015/121326
PCT Pub. Date: Aug. 20, 2015

(65) Prior Publication Data
US 2017/0051154 A1    Feb. 23, 2017

(30) Foreign Application Priority Data

Feb. 14, 2014   (EP) .................................... 14305196

(51) Int. Cl.
| | | |
|---|---|---|
| *C09C 1/30* | (2006.01) |
| *C01B 33/187* | (2006.01) |
| *C08L 9/06* | (2006.01) |
| *C01B 33/193* | (2006.01) |
| *C04B 26/04* | (2006.01) |
| *C04B 40/00* | (2006.01) |
| *C08K 3/36* | (2006.01) |
| *C04B 111/60* | (2006.01) |

(52) U.S. Cl.
CPC .......... *C09C 1/3063* (2013.01); *C01B 33/187* (2013.01); *C01B 33/193* (2013.01); *C04B 26/04* (2013.01); *C04B 40/0042* (2013.01); *C08K 3/36* (2013.01); *C08L 9/06* (2013.01); *C09C 1/30* (2013.01); *C09C 1/3045* (2013.01); *C09C 1/3072* (2013.01); *C01P 2006/12* (2013.01); *C01P 2006/22* (2013.01); *C04B 2111/60* (2013.01); *C08L 2205/025* (2013.01)

(58) Field of Classification Search
CPC ............................. C09C 1/3063; C01B 33/187
See application file for complete search history.

(56) References Cited

U.S. PATENT DOCUMENTS

| | | | | |
|---|---|---|---|---|
| 6,086,669 | A * | 7/2000 | Patkar ...................... | C08K 9/12 106/491 |
| 2009/0214449 | A1* | 8/2009 | Valero ................... | C01B 33/193 424/55 |
| 2013/0171051 | A1 | 7/2013 | Clouin et al. | |
| 2015/0368428 | A1* | 12/2015 | Guy ....................... | C08K 5/092 428/36.4 |

FOREIGN PATENT DOCUMENTS

WO    2006125927 A1    11/2006

OTHER PUBLICATIONS

"Adsorption of n-Alkanes at Zero Surface Coverage on Cellulose Paper and Wood Fibers", Gilles M. Dorris and Derek G. Gray, Journal of Colloid and Interface Science, vol. 77, No. 2, Oct. 1980, pp. 353-362.

* cited by examiner

*Primary Examiner* — Karuna P Reddy
(74) *Attorney, Agent, or Firm* — Osha Bergman Watanabe & Burton LLP

(57) ABSTRACT

The invention relates to a process for the preparation of a novel precipitated silica, wherein: a silicate is reacted with an acidifying agent, so as to obtain a silica suspension; said silica suspension is filtered, so as to obtain a filter cake; said filter cake is subjected to a liquefaction operation, in the absence of an aluminium compound; wherein a mixture of polycarboxylic acids is added to the filter cake, during or after the liquefaction operation. It also relates to novel precipitated silicas and to their uses.

16 Claims, No Drawings

PROCESS FOR THE PREPARATION OF PRECIPITATED SILICAS, PRECIPITATED SILICAS AND THEIR USES, IN PARTICULAR FOR THE REINFORCEMENT OF POLYMERS

CROSS-REFERENCE TO RELATED APPLICATIONS

The present application is a U.S. national phase entry under 35 U.S.C. § 371 of International Application No. PCT/EP2015/052911, filed on 12 Feb. 2015, which claims priority to European application No. 14305196.9 filed on 14 Feb. 2014, the entire content of these applications being incorporated herein by reference for all purposes.

TECHNICAL FIELD

The present invention relates to a process for the preparation of precipitated silica, to precipitated silica and its applications, such as reinforcing filler material in polymers. In particular the present invention relates to a process for the preparation of precipitated silica comprising the use of a mixture of polycarboxylic acids.

BACKGROUND ART

Precipitated silica has long been used as white reinforcing filler in polymeric materials and, in particular, in elastomers.

According to a general process, precipitated silica is prepared by means of a reaction whereby a silicate, such as the silicate of an alkaline metal, for instance sodium silicate, is precipitated with an acidifying agent, such as sulfuric acid, followed by separation of the resulting solid by filtration. A filter cake is thus obtained which is generally submitted to a liquefaction operation before being dried, generally by atomization. Several methods can be employed for the precipitation of silica: notably, the addition of an acidifying agent to a sediment of the silicate, or simultaneous addition, partial or total, of an acidifying agent and of the silicate to water or to a silicate sediment already present in the vessel.

The use of carboxylic acids in the preparation of precipitated silica has been previously disclosed, for instance in WO 2006/125927 (RHODIA CHIMIE) 30 Nov. 2006, which discloses the use of a carboxylic acid before or after the step of liquefaction of the filter cake. WO 2006/125927 however does not disclose the use of a mixture of polycarboxylic acids.

It has now been found that the use of a mixture of polycarboxylic acids during or after the step of liquefaction of the filter cake provides precipitated silica which, when used in polymeric compositions, affords reduced viscosity and similar or improved dynamic and mechanical properties with respect to previously known precipitated silicas.

DESCRIPTION OF INVENTION

A first object of the present invention is a process for the production of precipitated silica comprising the steps of:
  reacting at least one silicate with at least one acidifying agent, to provide a silica suspension;
  submitting said silica suspension to filtration to provide a filter cake;
  submitting said filter cake to a liquefaction step, said liquefaction step being carried out without the addition of an aluminium compound, to obtain a suspension of precipitated silica; and
  optionally, drying the precipitated silica obtained after the liquefaction step; wherein a mixture of polycarboxylic acids is added to the filter cake during or after the liquefaction step.

According to the process of the invention, the filter cake undergoes a liquefaction step during, or after, which a mixture of polycarboxylic acids is added to the filter cake. The liquefaction step is carried out without the addition of an aluminium compound to the filter cake. That is no aluminium compound is added to the filter cake before, during or after the liquefaction operation.

The term "liquefaction" is intended herein to indicate a process wherein a solid, namely the filter cake, is converted into a fluid-like mass. The expressions "liquefaction step", "liquefaction operation" or "disintegration" are interchangeably intended to denote a process wherein the filter cake is transformed into a flowable suspension, which can then be easily dried. After the liquefaction step the filter cake is in a flowable, fluid-like form and the precipitated silica is in suspension.

The filter cake subjected to the liquefaction step may be a mixture of more than one filter cake, each one obtained from the filtration of a silica suspension, or a part of the silica suspension, obtained from the precipitation step. The filter cake may optionally be washed or rinsed before the liquefaction step.

According to a first, preferred, embodiment of the invention, the mixture of polycarboxylic acids is added to the filter cake during the liquefaction step. The liquefaction step typically further comprises a mechanical treatment which results in a reduction of the granulometry of the silica in suspension. Said mechanical treatment may be carried out by passing the filter cake through a colloidal-type mill or a ball mill.

The mixture which is obtained after the liquefaction step, hereinafter referred to as "suspension of precipitated silica", is subsequently preferably dried, typically by spray drying.

According to a second embodiment of the invention the filter cake is first submitted to a liquefaction step, e.g. subjected to a mechanical treatment, as described above, to obtain a suspension of precipitated silica. A mixture of polycarboxylic acids is then added to the suspension of precipitated silica, that is to the disintegrated filter cake. The precipitated silica thus obtained may be subsequently dried, for instance by spray drying.

According to the process of the invention a mixture of polycarboxylic acids is added to the silica during or after the liquefaction step.

The expression "polycarboxylic acid" is used herein to refer to carboxylic acids comprising at least two carboxylic acid functional groups. The expression "carboxylic acid functional group" is used herein in its customary meaning, to refer to the —COOH functional group.

Polycarboxylic acids suitable for the process of the invention may have two, three, four or even more than four carboxylic acid functional groups. Preferably, the polycarboxylic acids suitable for the process of the invention are selected from the group consisting of the dicarboxylic acids and the tricarboxylic acids.

Suitable polycarboxylic acids are linear or branched, saturated or unsaturated, aliphatic polycarboxylic acids having from 2 to 20 carbon atoms and aromatic polycarboxylic acids. The polycarboxylic acids may optionally comprise hydroxy functional groups and/or halogen atoms.

Aliphatic polycarboxylic acids may optionally comprise heteroatoms in the main chain, e.g. N, S. Typically, the polycarboxylic acids are selected from the group consisting of the linear or branched, saturated or unsaturated, aliphatic polycarboxylic acids and aromatic polycarboxylic acids having from 2 to 16 carbon atoms.

Among the aliphatic polycarboxylic acids mention may be made of the linear polycarboxylic acids, saturated or unsaturated, having from 2 to 14 carbon atoms, preferably having from 2 to 12 carbon atoms. Suitable polycarboxylic acids may have 2, 3, 4, 5, 6, 7, 8, 9, 10, 11 or 12 carbon atoms. Suitable polycarboxylic acids may advantageously have 4, 5, 6, 7, 8, 9 or 10 carbon atoms, preferably 4, 5, 6, 7, or 8 carbon atoms. For instance the polycarboxylic acid may have 4, 5 or 6 carbon atoms.

Notable, non-limiting examples of suitable linear aliphatic polycarboxylic acids are the acids selected from the group consisting of oxalic acid, malonic acid, tricarballylic acid, succinic acid, glutaric acid, adipic acid, pimelic acid, suberic acid, azelaic acid, sebacic acid.

Among branched polycarboxylic acids mention may be made of methylsuccinic acid, ethylsuccinic acid, oxalosuccinic acid, methyladipic acid, methylglutaric acid, dimethylglutaric acid. For the avoidance of doubt, the expression "methylglutaric acid" is used herein to indicate both 2-methylglutaric acid and 3-methylglutaric acid, as well as mixtures of the two isomers in any proportion. The expression "2-methylglutaric acid" is used herein to indicate both the (S) and (R) forms of the compound as well as their racemic mixture.

Among the unsaturated polycarboxylic acids mention may be made of maleic acid, fumaric acid, itaconic acid, muconic acid, aconitic acid, traumatic acid, glutaconic acid.

Among polycarboxylic acids comprising hydroxyl functional groups mention may be made of malic acid, citric acid, isocitric acid, tartaric acid.

Aromatic polycarboxylic acids typically have from 6 to 20 carbon atoms. Among the aromatic polycarboxylic acids, mention may be made of the phthalic acids, namely phthalic acid, ortophthalic acid and isophthalic acid, trimesic acid, trimellitic acid.

Preferably the polycarboxylic acids for the process of the invention are selected from the group consisting of oxalic acid, malonic acid, tricarballylic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid, tartaric acid.

The polycarboxylic acids may be conveniently selected from the group consisting of adipic acid, succinic acid, ethylsuccinic acid, glutaric acid, methylglutaric acid, oxalic acid and citric acid.

Alternatively, the polycarboxylic acids may be selected from the group consisting of oxalic acid, malonic acid, tricarballylic acid, succinic acid, glutaric acid, adipic acid, methyladipic acid, pimelic acid, suberic acid, azelaic acid, sebacic acid, methylsuccinic acid, ethylsuccinic acid, methylglutaric acid, dimethylglutaric acid, malic acid, citric acid, isocitric acid, tartaric acid. Preferably, the polycarboxylic acids may be selected from the group consisting of oxalic acid, malonic acid, succinic acid, glutaric acid, adipic acid, methyladipic acid, pimelic acid, suberic acid, azelaic acid, sebacic acid, methylsuccinic acid, ethylsuccinic acid, methylglutaric acid, dimethylglutaric acid, malic acid, citric acid, isocitric acid, tartaric acid. Even more preferably the polycarboxylic acids may be selected from the group consisting of succinic acid, glutaric acid, adipic acid, methyladipic acid, pimelic acid, suberic acid, azelaic acid, sebacic acid, methylsuccinic acid, ethylsuccinic acid, methylglutaric acid, dimethylglutaric acid, malic acid, citric acid, isocitric acid, tartaric acid.

The mixture of polycarboxylic acids used during or after the liquefaction step comprises at least two polycarboxylic acids as defined above. The mixture may comprise two, three, four or even more than four polycarboxylic acids. Typically, the mixture comprises two polycarboxylic acids. Preferably, the mixture comprises three polycarboxylic acids as defined above. More preferably, the mixture comprises three polycarboxylic acids selected from the group consisting of the dicarboxylic acids and the tricarboxylic acids.

In an advantageous embodiment, the mixture comprises three polycarboxylic acids, preferably three dicarboxylic acids. Typically, the mixture consists of three dicarboxylic acids, although impurities may be present in an amount typically not exceeding 2.00 wt % of the total mixture of polycarboxylic acids.

In a first aspect of said embodiment, the mixture comprises adipic acid, glutaric acid and succinic acid. The three acids may be present in the mixture in any proportion.

Typically, the amount of adipic acid in the mixture is equal to or greater than 15.00 wt %, preferably equal to or greater than 20.00 wt %; the amount of adipic acid is generally equal to or less than 35.00 wt %, preferably equal to less than 30.00 wt %.

The amount of glutaric acid is typically equal to or greater than 40.00 wt %, preferably equal to or greater than 45.00 wt % and equal to or less than 65.00 wt %, preferably equal to or less than 60.00 wt %.

The amount of succinic acid in the mixture is equal to or greater than 13.00 wt %, preferably equal to or greater than 15.00 wt % and equal to or less than to 28.00 wt %, preferably equal to or less than 25.00 wt %. The percentages are referred to the total amount of polycarboxylic acids in the mixture. Such a mixture may advantageously be obtained from a process for the manufacture of adipic acid.

In a second aspect of said embodiment, the mixture comprises methylglutaric acid, ethylsuccinic acid and adipic acid. The three acids may be present in the mixture in any proportion.

Preferably, the mixture comprises a major proportion of methylglutaric acid with respect to the total combined weight of ethylsuccinic acid and adipic acid. Typically, the amount of methylglutaric acid in the mixture is at least 50.00 wt %; preferably it is equal to or greater than 60.00 wt %, more preferably equal to or greater than 80.00 wt %, more preferably equal to or greater than 90.00 wt %. The amount of methylglutaric acid in the mixture is equal to or less than 97.00 wt %, preferably equal to less than 96.00 wt %, more preferably equal to less than 95.50 wt %.

The amount of ethylsuccinic acid is generally equal to or greater than 3.00 wt %, preferably equal to or greater than 3.50 wt %, more preferably equal to or greater than 3.90 wt % and equal to or less than 20.00 wt %, preferably equal to or less than 12.00 wt %, more preferably equal to or less than 9.70 wt %.

The amount of adipic acid in the mixture is equal to or greater than 0.05, preferably equal to or greater than 0.08 wt %, more preferably equal to or greater than 0.10 wt % and equal to or less than to 20.00 wt %, preferably equal to or less than 10.00 wt %, more preferably equal to or less than 5.00 wt %.

The methylglutaric acid in the mixture may be 2-methylglutaric acid. Alternatively, the methylglutaric acid may be 3-methylglutaric acid. Still alternatively, the methylglutaric acid in the mixture may be a mixture of 2-methylglutaric acid and 3-methylglutaric acid, in any proportion of the two.

The mixture of polycarboxylic acids defined above may advantageously be obtained by hydrolysis, acid or basic, of a mixture comprising methylglutaronitrile, ethylsuccinonitrile and adiponitrile. Said mixture may conveniently derive from the process of preparation of adiponitrile by hydrocyanation of butadiene as known in the art.

In any of the polycarboxylic mixtures, a part or the totality of the carboxylic acid functional groups may be in the form of a carboxylic acid derivative, namely in the form of an anhydride, ester, or salt, for instance the salt of an alkaline metal (e.g. sodium or potassium) or an ammonium salt. The term "carboxylate" will be used hereinafter to indicate the derivatives of the carboxylic acid functional groups as defined above.

Thus, in a first embodiment, the mixture of polycarboxylic acids used in the process of the invention may comprise:
  methylglutaric acid, typically from 60.00 to 96.00 wt %, for instance from 90.00 to 95.50 wt %;
  ethylsuccinic anhydride, typically from 3.50 to 20.00 wt %, for instance from 3.90 to 9.70 wt %; and
  adipic acid, typically from 0.05 to 20.00 wt %, for instance from 0.10 to 0.30 wt %.

In an alternative, advantageous composition the mixture of polycarboxylic acids used in the process of the invention may comprise:
  methylglutaric acid, typically from 10.00 to 50.00 wt %, for instance from 25.00 to 40.00 wt %;
  methylglutaric anhydride, typically from 40.00 to 80.00 wt %, for instance from 55.00 to 70.00 wt %;
  ethylsuccinic anhydride, typically from 3.50 to 20.00 wt %, for instance from 3.90 to 9.70 wt %; and
  adipic acid, typically from 0.05 to 20.00 wt %, for instance from 0.10 to 0.30 wt %.

In the above composition methylglutaric anhydride may be 2-methylglutaric anhydride, 3-methylglutaric anhydride or a mixture of the two.

The polycarboxylic acids used in the invention may optionally be neutralised, for instance by reaction with a base such as NaOH or KOH, before being used in the inventive process. This allows modifying the pH of the resulting silica.

The mixture of at least two polycarboxylic acids can be added to the filter cake during or after the liquefaction step of the process in the form of an aqueous solution.

The amount of the mixture of polycarboxylic acids added to the filter cake in the inventive process, calculated with respect to the amount of silica (expressed in terms of $SiO_2$) in the filter cake, is generally of at least 0.50 wt %, even of at least 0.60 wt %, preferably of at least 0.70 wt %, more preferably at least 0.75 wt %. The amount of the mixture of polycarboxylic acids added to the filter cake typically does not exceed 2.50 wt %, preferably 2.00 wt %, more preferably 1.75 wt %, and even more preferably it does not exceed 1.50 wt %, with respect to the amount of silica (expressed in terms of $SiO_2$) in the filter cake. The amount of the mixture of polycarboxylic acids added to the filter cake may typically be in the range from 0.50 wt % to 2.00 wt %, even from 0.60 wt % to 1.75 wt % with respect to the amount of silica (expressed in terms of $SiO_2$) in the filter cake.

The precipitated silica suspension obtained at the end of the liquefaction step is typically dried. Drying may be carried out using any means known in the art. Preferably, drying is carried out by spray drying. For this purpose, any suitable type of spray dryer may be used, especially a turbine spray dryer or a nozzle spray dryer (liquid-pressure or two-fluid nozzle). In general, when the filtration is carried out by means of a filter press, a nozzle spray dryer is used, and when the filtration is carried out by means of a vacuum filter, a turbine spray dryer is used.

When a nozzle spray dryer is used, the precipitated silica is usually in the form of approximately spherical beads.

After drying, a milling step may then be carried out on the recovered product. The precipitated silica that can then be obtained is generally in the form of a powder. When a turbine spray dryer is used, the precipitated silica is typically in the form of a powder.

The dried precipitated silica (especially by a turbine spray dryer) or milled as indicated above, may optionally be subjected to an agglomeration step. Said agglomeration step consists, for example, of direct compression, wet granulation (that is to say with the use of a binder such as water, a silica suspension, etc.), extrusion or, preferably, dry compacting. The silica that can then be obtained after the agglomeration step is generally in the form of granules.

A second object of the present invention is a specific process for the preparation of a precipitated silica. Said process comprises the general steps of a precipitation reaction between a silicate and an acidifying agent, whereby a silica suspension is obtained, followed by the separation and the drying of this suspension.

The process which is the second object of the invention comprises steps of:
  (i) providing at least a portion of the total amount of the silicate involved in the reaction and an electrolyte in a vessel, the concentration of silicate (expressed as $SiO_2$) initially present in said vessel being less than 100 g/l and, preferably, the concentration of electrolyte initially present in said vessel being less than 19 g/l;
  (ii) adding an amount of an acidifying agent to said vessel to obtain a pH value for the reaction medium of at least 7.0, in particular of between 7.0 and 8.5;
  (iii) further adding an acidifying agent and, if appropriate, simultaneously the remaining amount of silicate to the reaction medium to obtain a silica suspension;
  (iv) submitting said silica suspension to filtration to provide a filter cake;
  (v) submitting said filter cake to a liquefaction step, said liquefaction step being carried out in the absence of an aluminium compound, to obtain a suspension of precipitated silica; and
  (vi) optionally, drying the precipitated silica obtained after the liquefaction step; wherein a mixture of polycarboxylic acids is added to the filter cake during or after the liquefaction step.

The filter cake obtained at the end of the filtration step is subjected to a liquefaction operation. The liquefaction step is carried out in the absence of an aluminium compound added to the filter cake. The filter cake thus obtained, exhibits a solids content of at most 30 wt %, preferably of at most 25 wt %.

All definition and preferences provided above for the process according to the first object of the invention equally apply to the process of the second object.

The choice of the acidifying agent and of the silicate is made in a way well known in the art. Use is generally made, as acidifying agent, of a strong inorganic acid, such as sulfuric acid, nitric acid or hydrochloric acid. Alternatively, an organic acid, such as acetic acid, formic acid or carbonic acid may also be used in this step of the process.

The acidifying agent can be dilute or concentrated; the acid concentration can be between 0.4 and 36.0N, for example between 0.6 and 1.5N.

In particular, in the case where the acidifying agent is sulfuric acid, its concentration can be between 40 and 180 g/l, for example between 60 and 130 g/l.

Any common form of silicate may be used in the process, such as metasilicates, disilicates and advantageously an alkali metal silicate, in particular sodium or potassium silicate.

The silicate initially present in the vessel conventionally has a concentration (expressed in terms of $SiO_2$) of between 40 and 330 g/l, for example between 60 and 300 g/l.

Preferably, the silicate is sodium silicate. When sodium silicate is used, it generally exhibits a ratio $SiO_2/Na_2O$ by weight of between 2.0 and 4.0, in particular between 2.4 and 3.9, for example between 3.1 and 3.8.

During stage (i), a silicate and an electrolyte are initially charged in an appropriate reaction vessel. The amount of silicate initially present in the vessel advantageously represents only a portion of the total amount of silicate involved in the reaction.

The term "electrolyte" is understood in the present specification as normally accepted, that is to say that it means any ionic or molecular substance which, when in solution, decomposes or dissociates to form ions or charged particles. As suitable electrolytes mention may be made of alkali metals and alkaline earth metals salts, in particular the salt of the starting silicate metal and of the acidifying agent, for example sodium chloride in the case of the reaction of a sodium silicate with hydrochloric acid or, preferably, sodium sulfate in the case of the reaction of a sodium silicate with sulfuric acid.

According to one characteristic of this preparation process, the initial concentration of electrolyte in the vessel is less than 19 g/l, in particular less than 18 g/l, especially less than 17 g/l, for example less than 15 g/l; while generally being greater than 6 g/l.

According to another characteristic of this process, the initial concentration of silicate (expressed in terms of $SiO_2$) in the vessel is less than 100 g/l. Preferably, the concentration is less than 80 g/l, in particular less than 70 g/l. In particular, when the acid used for the neutralization has a high concentration, in particular of greater than 70%, it is then advisable to work with an initial concentration of silicate in the vessel (expressed in terms of $SiO_2$) of less than 80 g/l.

The addition of acidifying agent in stage (ii) of the process leads to a drop in the pH of the reaction medium. Addition of the acidifying agent is carried out until a value of the pH of the reaction medium of at least 7.0, in particular of between 7.0 and 8.5, for example of between 7.5 and 8.5, is reached.

Once the desired pH value has been reached, and in the case of a process wherein only a portion of the total amount of silicate is initially present in the vessel, a simultaneous addition of acidifying agent and of the remaining amount of silicate is then advantageously carried out in stage (iii).

This simultaneous addition is generally carried out in such a way that the value of the pH of the reaction medium is always equal (to within ±0.1) to the value reached at the end of stage (ii).

On conclusion of stage (iii) and in particular after the abovementioned simultaneous addition of acidifying agent and silicate, a maturing of the resulting reaction medium (aqueous suspension) can be carried out, at the same pH obtained at the end of stage (iii). This step is generally carried out with stirring of the suspension, for example for 2 to 45 minutes, in particular for 3 to 30 minutes.

Both when only a portion of the total amount of silicate is initially present, and when the total amount of silicate is present, it is possible, after the precipitation, in an optional subsequent stage, to add an additional amount of acidifying agent to the reaction medium. This addition is generally carried out until a pH value of between 3.0 and 6.5, preferably between 4.0 and 6.5, is obtained.

The temperature of the reaction medium is generally between 75° and 97° C., preferably between 80° and 96° C.

According to a first aspect of this preparation process, the reaction is carried out at a constant temperature of between 75° and 97° C. According to an alternative aspect of this process, the temperature at the end of the reaction is higher than the temperature at the start of the reaction. Thus, the temperature at the start of the reaction is preferably maintained between 75° and 90° C.; then, the temperature is increased preferably up to a value of between 90° and 97° C., at which it is maintained until the end of the reaction.

At the end of steps (i) to (iii) as above described, a silica suspension is obtained. A liquid/solid separation step is subsequently carried out. The subsequent steps of the process may be the same as the steps of the process which is the first object of the invention.

The separation step normally comprises a filtration, followed, if necessary, by a washing operation, carried out by means of any suitable method, for example by means of a belt filter, a vacuum filter or, preferably, a filter press. A filter cake is obtained at the end of the filtration step.

The filter cake is then subjected to a liquefaction operation. According to the present invention, a mixture comprising at least two polycarboxylic acids, as above defined, is added during or after the liquefaction operation.

Preferably, in this preparation process, the suspension of precipitated silica obtained after the liquefaction step exhibits, immediately before it is dried, a solids content of at most 25 wt %, in particular of at most 24 wt %, especially of at most 23 wt %, for example of at most 22 wt %.

The disintegrated filter cake is subsequently dried. Drying can be carried out according to any means known in the art as described above.

The dried or milled product can optionally be subjected to an agglomeration step as described above. The precipitated silica which is obtained after the agglomeration step generally exists in the form of granules.

The invention also relates to the precipitated silica obtained by the processes according to the invention.

In general, the precipitated silica of the invention exhibits, at its surface, molecules of the mixture of polycarboxylic acids and/or of the carboxylates corresponding to the polycarboxylic acids employed in the process.

Accordingly, a further object of the present invention is thus a composition comprising precipitated silica and a mixture of at least two polycarboxylic acids or derivatives thereof.

All definitions and preferences concerning the nature of the polycarboxylic acids, their derivatives and their mixtures defined above in respect of the process for making precipitated silica equally apply to the precipitated silica of the invention.

The precipitated silica of the invention can be used in particular as filler for polymer compositions, advantageously providing them with a reduction in melt viscosity. The dynamic and mechanical properties of said polymer compositions are generally maintained unaltered, when not improved, over those of corresponding polymer compositions comprising precipitated silicas of the prior art.

The precipitated silica according to the invention exhibits a total content (C) of the mixture of polycarboxylic acids and/or of the corresponding carboxylates, expressed as total carbon, of at least 0.15% by weight, in particular of at least 0.20% by weight. The content (C) of polycarboxylic acids and/or corresponding carboxylates can be of at least 0.25% by weight, in particular of at least 0.30% by weight, for example of at least 0.35% by weight, indeed even of at least 0.45% by weight. The content (C) of polycarboxylic acids and/or corresponding carboxylates, expressed as total carbon is not particularly limited, although it typically does not exceed 10.00% weight, in particular it does not exceed 5.00% by weight.

The total content of the mixture of polycarboxylic acids and/or of the corresponding carboxylates, denoted (C), expressed as total carbon, can be measured using a carbon/sulfur analyzer, such as the Horiba EMIA 320 V2. The principle of the carbon/sulfur analyzer is based on the combustion of a solid sample in a stream of oxygen in an induction furnace (adjusted to approximately 170 mA) and in the presence of combustion accelerators (approximately 2 grams of tungsten (in particular Lecocel 763-266) and approximately 1 gram of iron). The carbon present in the sample to be analyzed (weight of approximately 0.2 gram) combines with the oxygen to form $CO_2$, CO. These gases are subsequently analyzed by an infrared detector. The moisture from the sample and the water produced during these oxidation reactions is removed by passing over a cartridge comprising a dehydrating agent (magnesium perchlorate) in order not to interfere with the infrared measurement. The result is expressed as percentage by weight of element carbon.

The presence of the polycarboxylic acids and/or of the corresponding carboxylates at the surface of the inventive precipitated silica can be determined by the presence of shoulders characteristic of the C—O and C=O bonds, visible in the infrared spectra, obtained in particular by surface (transmission) infrared or diamond-ATR infrared (in particular between 1540 and 1590 $cm^{-1}$ and between 1380 and 1420 $cm^{-1}$ for C—O, and between 1700 and 1750 $cm^{-1}$ for C=O).

The surface infrared analysis (by transmission) may be carried out on a Bruker Equinox 55 spectrometer on a pellet of pure product. The pellet is typically obtained after grinding the silica as is in an agate mortar and pelleting at 2 T/$cm^2$ for 10 seconds. The diameter of the pellet is generally 17 mm. The weight of the pellet is between 10 and 20 mg. The pellet thus obtained is placed in the high vacuum chamber ($10^{-7}$ mbar) of the spectrometer for one hour at ambient temperature before the analysis by transmission. Acquisition takes place under high vacuum (acquisition conditions: from 400 $cm^{-1}$ to 6000 $cm^{-1}$; number of scans: 100; resolution: 2 $cm^{-1}$).

The diamond-ATR analysis, may be carried out on a Bruker Tensor 27 spectrometer, and it consists in depositing, on the diamond, a spatula tip of pre-ground silica in an agate mortar and in then exerting a pressure. The infrared spectrum is recorded on the spectrometer in 20 scans, from 650 $cm^{-1}$ to 4000 $cm^{-1}$. The resolution is 4 $cm^{-1}$.

In an advantageous embodiment, the inventive composition comprises precipitated silica and adipic acid in the acid form and/or in the carboxylate form, glutaric acid in the acid form and/or in the carboxylate form, and succinic acid in the acid form and/or in the carboxylate form. The adipic, glutaric and succinic acid and/or acid carboxylate are preferably present on the surface of the precipitated silica.

In another advantageous embodiment, the inventive composition comprises precipitated silica and methylglutaric acid in the acid form and/or in the carboxylate form, ethylsuccinic acid in the acid form and/or in the carboxylate form, and adipic acid in the acid form and/or in the carboxylate form. The methylglutaric acid, the ethylsuccinic acid and the adipic acid and/or acid carboxylate are preferably present on the surface of the precipitated silica.

Depending on the source of the silicate starting material employed in the manufacturing process, the precipitated silica of the invention may contain additional elements, for instance metals. Among said additional elements mention may be made of aluminium. The content (Al) of aluminium generally does not exceed 700 ppm, preferably it does not exceed 600 ppm and more preferably it does not exceed 500 ppm. In some instances however the content (Al) of aluminium may be as high as 1000 ppm, even as high as 1500 ppm.

The content of aluminum, denoted (Al), can be determined by wavelength dispersive X-ray fluorescence, for example with a Panalytical 2400 spectrometer or, preferably, with a Panalytical MagixPro PW2540 spectrometer. The Al determination by X-ray fluorescence is typically carried out on homogeneous powder of the precipitated silica, obtained for instance by grinding granules of the precipitated silica. The powder is analyzed as is in a vessel having a diameter of 40 mm with a polypropylene film with a thickness of 6 μm, under a helium atmosphere, at an irradiation diameter of 37 mm, the amount of silica analyzed is 9 $cm^3$. The measurement of the aluminum content, is obtained from the Kα line (2θ angle=145°, PE002 crystal, 550 μm collimator, gas flow detector, rhodium tube, 32 kV and 125 mA). The intensity of this line is proportional to the aluminum content. The intensity of this line is proportional to the aluminum content. It is possible to employ a precalibration carried out using another measurement method, such as ICP-AES (Inductively Coupled Plasma-Atomic Emission Spectroscopy).

The aluminum content can also be measured by any other suitable method, for example by ICP-AES after dissolving in water in the presence of hydrofluoric acid.

The precipitated silica according to the invention typically has a BET specific surface of at least 45 $m^2/g$, in particular of at least 70 $m^2/g$ and preferably of at least 80 $m^2/g$. The BET specific surface may be even of at least 100 $m^2/g$, preferably of at least 120 $m^2/g$, and more preferably of at least 130 $m^2/g$.

The BET specific surface generally is at most 550 $m^2/g$, in particular at most 370 $m^2/g$, and even at most 300 $m^2/g$. The BET specific surface may be at most 240 $m^2/g$, in particular at most 190 $m^2/g$, and even at most 170 $m^2/g$. The BET specific surface is determined according to the Brunauer-Emmett Teller method described in The Journal of the American Chemical Society, Vol. 60, page 309, February 1938, and corresponding to the standard NF ISO 5794-1, Appendix D (June 2010).

In an embodiment of the invention, the precipitated silica according to the invention is characterized in that it has:
a BET specific surface of between 45 and 550 $m^2/g$, in particular between 70 and 370 $m^2/g$, especially between 80 and 300 $m^2/g$, and
a content (C) of polycarboxylic acid and/or corresponding carboxylate, expressed as total carbon, of at least 0.15% by weight, in particular of at least 0.20% by weight.

In another embodiment, the precipitated silica according to the invention is characterized in that it has:

a BET specific surface of between 45 and 550 m²/g, in particular between 70 and 370 m²/g, especially between 80 and 300 m²/g;

a content (C) of polycarboxylic acid and/or corresponding carboxylate, expressed as total carbon, of at least 0.15% by weight, in particular of at least 0.20% by weight; and a content of aluminium (Al) not exceeding 1500 ppm.

In general, the precipitated silica according to the invention has a CTAB specific surface of between 40 and 525 m²/g, in particular between 70 and 350 m²/g, especially between 80 and 310 m²/g, for example between 100 and 240 m²/g. The CTAB specific surface can in particular be between 130 and 200 m²/g, for example between 140 and 190 m²/g. The CTAB specific surface is the external surface, which can be determined according to the standard NF ISO 5794-1, Appendix G (June 2010).

The precipitated silica according to the invention may exhibit a BET specific surface/CTAB specific surface ratio of between 0.9 and 1.2, that is to say that it exhibits a low microporosity.

Preferably, the precipitated silica according to the invention exhibits a dispersive component of the surface energy $\gamma_s^d$ of less than 43 mJ/m², in particular of less than 42 mJ/m².

It can exhibit a dispersive component of the surface energy $\gamma_s^d$ of at least 25 mJ/m² and of less than 43 mJ/m², in particular of between 27 and 43 mJ/m², for example of between 28 and 42 mJ/m².

Preferably, the inventive precipitated silica exhibits a dispersive component of the surface energy $\gamma_s^d$ of less than 40 mJ/m². In some instances the dispersive component of the surface energy $\gamma_s^d$ may be of less than 35 mJ/m².

The dispersive component of the surface energy $\gamma_s^d$ is determined by inverse gas chromatography on granules, having an average size of 106 μm-250 μm.

The technique used to calculate the dispersive component of the surface energy $\gamma_s^d$ is Inverse Gas Chromatography at Infinite Dilution (IGC-ID) at 110° C. using a series of alkanes (normal alkanes) ranging from 6 to 10 carbon atoms, a technique based on gas chromatography but where the roles of the mobile phase and of the stationary phase (packing) are reversed. In this instance, the stationary phase in the column is replaced by the (solid) material to be analyzed, in this instance the precipitated silica. With regard to the mobile phase, it consists of the carrier gas (helium) and of the "probe" molecules chosen as a function of their interaction capability. The measurements are successively carried out with each probe molecule. For each measurement, each probe molecule is injected into the column, in a very small amount (infinite dilution), as a mixture with methane. Methane is used to determine to, the dead time of the column.

The net retention time ($t_N$) of the injected probe is obtained by subtraction of the dead time to from the retention time of the probe. Physically, $t_N$ corresponds to the mean time which the probe molecule has spent in contact with the stationary phase (the solid analyzed). For each probe molecule injected, three net retention times $t_N$ are measured. The mean value and the corresponding standard deviation are used to determine the specific retention volumes (VA on the basis of the following relationship (formula [1]).

$$V_g^0 = \frac{D_c t_N}{M_S} \times \frac{273.15}{T}$$ formula [1]

The specific retention volume $V_g^0$ corresponds to the volume of carrier gas (referred to 0° C.) necessary to elute the probe molecule per 1 gram of stationary phase (solid examined). This standard quantity makes it possible to compare the results, whatever the flow rate of carrier gas and the weight of stationary phase used. In formula [1]: $M_s$ the weight of solid in the column, $D_c$ the flow rate of carrier gas and T the measurement temperature.

The specific retention volume is subsequently used to calculate $\Delta G_a$, the variation in free enthalpy of adsorption of the probe, according to the formula [2], wherein R is the universal ideal gas constant (R=8.314 J·K⁻¹·mol⁻¹), on the solid present in the column.

$$\Delta G_a = RT \, Ln(V_g^0)$$ formula [2]

This quantity $\Delta G_a$ is the starting point for the determination of the dispersive component of the surface energy ($\gamma_s^d$). The latter is obtained by plotting the straight line representing the variation in free enthalpy of absorption ($\Delta G_a$) as a function of the carbon number $n_c$ of the n-alkane probes, as shown in the table below.

TABLE 1

| n-Alkane probes | $n_c$ |
|---|---|
| n-hexane | 6 |
| n-heptane | 7 |
| n-octane | 8 |
| n-nonane | 9 |
| n-decane | 10 |

It is then possible to determine the dispersive component of the surface energy $\gamma_s^d$ from the slope $\Delta G_a^{CH2}$ of the straight line of the normal alkanes, corresponding to the free enthalpy of adsorption of the methylene group, obtained for a measurement temperature of 110° C.

The dispersive component of the surface energy $\gamma_s^d$ is then related to the free enthalpy of adsorption $\Delta G_a^{CH2}$ of the methylene group (Dorris and Gray method, *J. Colloid Interface Sci.*, 77 (180), 353-362) by the following relationship:

$$\gamma_S^d = \frac{(\Delta G_a^{CH_2})^2}{4N_A^2 \cdot a_{CH_2}^2 \cdot \gamma_{CH_2}}$$

wherein $N_A$ is Avogadro's number (6.02×10²³ mol⁻¹), $\alpha_{CH2}$ is the area occupied by an adsorbed methylene group (0.06 nm²) and $\gamma_{CH2}$ is the surface energy of a solid consisting solely of methylene group and determined on polyethylene (35.6 mJ/m² at 20° C.).

The precipitated silica according to the invention exhibits a water uptake of at least 6.0%, in particular of at least 7.0%, especially of at least 7.5%, for example of at least 8.0%, indeed even of at least 8.5%. The water uptake generally does not exceed 15.0%.

In an additional embodiment of the invention, the inventive precipitated silica is characterized in that it has:

a BET specific surface of between 45 and 550 m²/g, in particular between 70 and 370 m²/g, especially between 80 and 300 m²/g, and a content (C) of polycarboxylic acid and/or corresponding carboxylate, expressed as total carbon, of at least 0.15% by weight, in particular of at least 0.20% by weight;

a content of aluminium (Al) not exceeding 1500 ppm; and a water uptake of at least 6.0%.

The technique used to measure the water uptake consists generally in placing the pre-dried silica sample under given relative humidity conditions for a predetermined time; the silica then hydrates, which causes the weight of the sample to change from an initial value w (in the dried state) to a final value w+dw. "Water uptake" of a silica specifically denotes, in particular throughout the continuation of the account, the dw/w ratio (that is to say, the weight of water incorporated in the sample with respect to the weight of the sample in the dry state), expressed as percentage, calculated for a silica sample subjected to the following conditions during the measurement method: preliminary drying: 8 hours, at 150° C.; hydration: 24 hours, at 20° C., and under a relative humidity of 70%.

The experimental protocol employed consists in successively: precisely weighing approximately 2 grams of the silica to be tested; drying, for 8 hours, the silica thus weighed out in an oven adjusted to a temperature of 105° C.; determining the weight w of the silica obtained on conclusion of this drying operation; placing, for 24 hours, at 20° C., the dried silica in a closed container, such as a desiccator, comprising a water/glycerol mixture, so that the relative humidity of the closed medium is 70%; determining the weight (w+dw) of the silica obtained subsequent to this treatment at 70% relative humidity for 24 hours, the measurement of this weight being carried out immediately after having removed the silica from the desiccator, so as to prevent variation in the weight of the silica under the influence of the change in hygrometry between the medium at 70% relative humidity and the atmosphere of the laboratory.

In general, the precipitated silica according to the invention exhibits a high ability to disperse (in particular in elastomers) and to deagglomerate.

The precipitated silica according to the invention can exhibit a diameter $\varnothing_{50M}$, after deagglomeration with ultrasound, of at most 5 μm, preferably of at most 4 μm, in particular of between 3.5 and 2.5 μm.

The precipitated silica according to the invention can exhibit an ultrasound deagglomeration factor $F_{DM}$ of greater than 5.5 ml, in particular of greater than 7.5 ml, for example of greater than 12 ml.

In general, the ability of silica to disperse and to deagglomerate can be quantified by means of the specific deagglomeration test described below.

A particle size measurement is carried out (by laser diffraction) on a suspension of silica deagglomerated beforehand by ultrasonication; the ability of the silica to deagglomerate (cleavage of the objects from 0.1 to several tens of microns) is thus measured. The deagglomeration under ultrasound is carried out using a Vibracell Bioblock (600 W) sonicator equipped with a probe having a diameter of 19 mm. The particle size measurement is carried out by laser diffraction using a MALVERN (Mastersizer 2000) particle sizer, employing the Fraunhofer theory. One gram (+/−0.1 gram) of silica are introduced into a 50 ml beaker (height: 7.5 cm and diameter: 4.5 cm) and the weight is made up to 50 grams by addition of 49 grams (+/−0.1 gram) of deionized water. A 2% aqueous silica suspension is thus obtained. The aqueous silica suspension is thus deagglomerated by ultrasound sonication for 7 minutes. The particle size measurement is subsequently carried out by introducing, into the vessel of the particle sizer all the obtained suspension.

The median diameter $\varnothing_{50M}$ (or median diameter Malvern), after deagglomeration with ultrasound, is such that 50% of the particles by volume have a size of less than $\varnothing_{50M}$ and 50% have a size of greater than $\varnothing_{50M}$. The value of the median diameter $\varnothing_{50M}$ which is obtained decreases in proportion as the ability of the silica to deagglomerate increases.

It is also possible to determine the ratio 10×value of blue laser obscuration/value of red laser obscuration, this optical density corresponding to the true value detected by the particle sizer during the introduction of the silica. This ratio (Malvern deagglomeration factor $F_{DM}$) is indicative of the content of particles with a size of less than 0.1 μm which are not detected by the particle sizer. This ratio increases in proportion as the ability of the silica to deagglomerate increases.

Another parameter of the precipitated silica according to the invention is the distribution of its pore volume and in particular in the distribution of the pore volume which is generated by the pores having diameters of less than or equal to 400 Å. The latter volume corresponds to the useful pore volume of the fillers employed in the reinforcement of elastomers. In general, the analysis of the programs shows that this silica, equally well in the form of substantially spherical beads (microbeads), of powder or of granules, preferably has a pore distribution such that the pore volume generated by the pores having a diameter of between 175 and 275 Å (V2) represents at least 50%, in particular at least 55%, especially between 55% and 65%, for example between 55% and 60%, of the pore volume generated by the pores with diameters of less than or equal to 400 Å (V1). When the precipitated silica according to the invention is provided in the form of granules, it can optionally have a pore distribution such that the pore volume generated by the pores having a diameter of between 175 and 275 Å (V2) represents at least 60% of the pore volume generated by the pores with diameters of less than or equal to 400 Å (V1).

The pore volumes and pore diameters are typically measured by mercury (Hg) porosimetry using a Micromeritics Autopore 9520 porosimeter and are calculated by the Washburn relationship with a contact angle theta equal to 130° and a surface tension gamma equal to 484 dynes/cm (standard DIN 66133). Each sample is pre-dried in an oven at 200° C. for 2 hours before measurement is carried out.

The precipitated silica according to the invention preferably exhibits a pH of between 3.5 and 7.5, more preferably still between 4.0 and 7.0. The pH is measured according to a modification of standard ISO 787/9 (pH of a 5% suspension in water) as follows: 5 grams of silica are weighed to within about 0.01 gram into a 200 ml beaker. 95 ml of water, measured from a graduated measuring cylinder, are subsequently added to the silica powder. The suspension thus obtained is vigorously stirred (magnetic stirring) for 10 minutes. The pH measurement is then carried out.

The precipitated silica according to the invention can be provided in any physical state, that is to say that it can be provided in the form of substantially spherical beads (microbeads), of a powder or of granules.

It can thus be provided in the form of substantially spherical beads with a mean size of at least 80 μm, preferably of at least 150 μm, in particular of between 150 and 270 μm; this mean size is determined according to the standard NF X 11507 (December 1970) by dry sieving and determination of the diameter corresponding to a cumulative oversize of 50%.

It can also be provided in the form of a powder with a mean size of at least 3 μm, in particular of at least 10 μm, preferably of at least 15 μm.

It can be provided in the form of granules with a size of at least 1 mm, for example of between 1 and 10 mm, in particular along the axis of their greatest dimension.

The silica according to the invention is preferably obtained by the process described above, in particular the process which is the second object of the invention.

Advantageously, the precipitated silica according to the present invention or obtained by the process according to the invention described above confer to the polymeric (elastomeric) compositions into which they are introduced, a highly satisfactory compromise in properties, in particular a reduction in their viscosity. Preferably, they exhibit a good ability to disperse and to deagglomerate in polymeric, preferably elastomeric, compositions.

The precipitated silica according to the present invention or (capable of being) obtained by the process described above according to the invention can be used in numerous applications.

The inventive precipitated silica can be employed, for example, as catalyst support, as absorbent for active materials (in particular support for liquids, especially used in food, such as vitamins (vitamin E) or choline chloride), in polymer, especially elastomer, compositions, as viscosifying, texturizing or anticaking agent, as battery separator component, or as additive for toothpaste, concrete or paper.

However, the inventive precipitated silica finds a particularly advantageous application in the reinforcement of natural or synthetic polymers.

The polymer compositions in which it can be employed, in particular as reinforcing filler, are generally based on one or more polymers or copolymers, in particular on one or more elastomers, preferably exhibiting at least one glass transition temperature of between −150° C. and +300° C., for example between −150° C. and +20° C.

The expression "copolymer" is used herein to refer to polymers comprising recurring units deriving from at least two monomeric units of different nature.

Mention may in particular be made, as possible polymers, of diene polymers, in particular diene elastomers.

For example, use may be made of polymers or copolymers deriving from aliphatic or aromatic monomers, comprising at least one unsaturation (such as, in particular, ethylene, propylene, butadiene, isoprene, styrene, acrylonitrile, isobutylene or vinyl acetate), polybutyl acrylate, or their mixtures; mention may also be made of functionalized elastomers, that is elastomers functionalized by chemical groups positioned along the macromolecular chain and/or at one or more of its ends (for example by functional groups capable of reacting with the surface of the silica), and halogenated polymers. Mention may be made of polyamides, ethylene homo- and copolymers, propylene homo- and copolymers.

The polymer (copolymer) can be a bulk polymer (copolymer), a polymer (copolymer) latex or else a solution of polymer (copolymer) in water or in any other appropriate dispersing liquid.

Among diene elastomers mention may be made, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur (vulcanisates are then obtained) or crosslinked, in particular with peroxides or other crosslinking systems (for example diamines or phenolic resins).

In general, the polymer compositions additionally comprise at least one (silica/polymer) coupling agent and/or at least one covering agent; they can also comprise, inter alia, an antioxidant.

Use may in particular be made, as coupling agents, as nonlimiting examples, of "symmetrical" or "unsymmetrical" silane polysulfides; mention may more particularly be made of bis(($C_1$-$C_4$)alkoxyl($C_1$-$C_4$)alkylsilyl($C_1$-$C_4$)alkyl) polysulfides (in particular disulfides, trisulfides or tetrasulfides), such as, for example, bis(3-(trimethoxysilyl)propyl) polysulfides or bis(3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups.

The coupling agent can be grafted beforehand to the polymer. It can also be employed in the free state (that is to say, not grafted beforehand) or grafted at the surface of the silica. It is the same for the optional covering agent.

The coupling agent can optionally be combined with an appropriate "coupling activator", that is to say a compound which, mixed with this coupling agent, increases the effectiveness of the latter.

The proportion by weight of the inventive silica in the polymer composition can vary within a fairly wide range. It normally represents from 10% to 200%, in particular from 20% to 150%, especially from 20% to 80% (for example from 30% to 70%) or from 80% to 120% (for example from 90% to 110%), of the amount of the polymer(s).

The silica according to the invention can advantageously constitute all of the reinforcing inorganic filler and even all of the reinforcing filler of the polymer composition.

However, this silica according to the invention can optionally be combined with at least one other reinforcing filler, such as, in particular, a commercial highly dispersible silica, such as, for example, Zeosil® Z1165MP or Zeosil® Z1115MP (commercially available from Solvay), a treated precipitated silica (for example, a precipitated silica "doped" using a cation, such as aluminum); another reinforcing inorganic filler, such as, for example, alumina, indeed even a reinforcing organic filler, in particular carbon black (optionally covered with an inorganic layer, for example of silica). The silica according to the invention then preferably constitutes at least 50% by weight, indeed even at least 80% by weight, of the total amount of the reinforcing filler.

The compositions comprising the precipitated silica of the invention may be used for the manufacture of a number of articles. Nonlimiting examples of finished articles comprising at least one of (in particular based on) polymer composition described above (in particular based on the above-mentioned vulcanisates), are for instance of footwear soles (preferably in the presence of a (silica/polymer) coupling agent, for example triethoxysilylpropyl tetrasulfide), floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, battery separators, conveyor belts, transmission belts or, preferably, tires, in particular tire treads (especially for light vehicles or for heavy-goods vehicles (for example trucks)).

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Example 1

A silica suspension was prepared according to the process disclosed in Example 12 of EP520862.

The silica suspension was filtered and washed on a filter press and was then subjected to compacting at a pressure of 5.5 bar on the same filter.

Prior to the liquefaction operation, a solution in water of a polycarboxylic acid mixture (34 wt %) was prepared by dissolving (at 35° C.) a mixture of polycarboxylic acids having the following composition: 94.8 wt % of 2-methylglutaric acid, 4.9 wt % of ethylsuccinic acid, and 0.2 wt % of adipic acid and 0.1 wt % of others. The solution is hereinafter referred to as "MGA solution".

The filter cake was subjected to a liquefaction operation in a continuous vigorously stirred reactor with simultaneous addition to the cake of 47 grams of the MGA solution (MGA mixture/SiO$_2$ ratio by weight of 1.0%).

This disintegrated cake was subsequently dried using a nozzle atomizer by spraying the disintegrated cake through a 2.5 mm nozzle with a pressure of 1 bar under the following mean conditions of flow rate and of temperatures:

Mean inlet temperature: 300° C.
Mean outlet temperature: 145° C.
Mean flow rate: 15 l/h.

The characteristics of the inventive silica S1 obtained (in the form of substantially spherical beads) were the following:

| | |
|---|---|
| Content of polycarboxylic acid + carboxylate (C) (%) | 0.41 |
| Aluminum (Al) content (%) | 0.05 |
| BET (m$^2$/g) | 150 |
| CTAB (m$^2$/g) | 164 |
| $\gamma_s^d$ (mJ/m$^2$) | 33 |
| Water uptake (%) | 9.0 |
| V2/V1 (%) | 55.8 |
| pH | 4.3 |

Comparative Example 1

Following the same procedure of Example 1 a filter cake was obtained which was subjected to a liquefaction operation in a continuous vigorously stirred reactor with simultaneous addition to the cake of 45 grams of a solution containing maleic acid (maleic acid/SiO$_2$ ratio by weight of 1.0%).

This disintegrated cake was subsequently dried using a nozzle atomizer by spraying the disintegrated cake through a 1.5 mm nozzle with a pressure of 25 bar under the following mean conditions of flow rate and of temperatures:

Mean inlet temperature: 250° C.
Mean outlet temperature: 140° C.
Mean flow rate: 15 l/h.

The characteristics of the silica CS1 obtained (in the form of substantially spherical beads) were the following:

| | |
|---|---|
| Content of polycarboxylic acid + carboxylate (C) (%) | 0.34 |
| Aluminum (Al) content (%) | 0.05 |
| BET (m$^2$/g) | 161 |
| CTAB (m$^2$/g) | 168 |
| $\gamma_s^d$ (mJ/m$^2$) | 52 |
| Water uptake (%) | 9.0 |
| V2/V1 (%) | 59.7 |
| pH | 3.4 |

Example 2 and Comparative Example 2

The following materials were used in the preparation of SBR-based elastomeric compositions:

SBR: SBR Buna VSL5025-2 from Lanxess; with 50+/−4% of vinyl units; 25+/−2% of styrene units; Tg in the vicinity of −20° C.; 100 phr of SBR extended with 37.5+/−2.8% by weight of oil BR: oil Buna CB 25 from Lanxess S1: precipitated silica according to the present invention prepared according to Example 1

CS1: precipitated silica prepared according to Comparative Example 1

Coupling agent: Luvomaxx TESPT from Lehvoss France sarl

Plasticizer: Nytex 4700 naphtenic plasticizer from Nynas

Antioxidant: N-(1,3-Dimethylbutyl)-N-phenyl-para-phenylenediamine; Santoflex 6-PPD from Flexsys DPG: Diphenylguanidine; Rhenogran DPG-80 from RheinChemie CBS: N-Cyclohexyl-2-benzothiazolesulfenamide; Rhenogran CBS-80 from RheinChemie The compositions of the elastomeric blends, expressed as parts by weight per 100 parts of elastomers (phr), are shown in Table 1 below, were prepared in an internal mixer of Brabender type (380 ml) according to the following Procedure.

Procedure for the Preparation of Rubber Compositions

The preparation of SBR and natural rubber compositions was carried out in two successive preparation phases: a first phase consisting of a high-temperature thermo-mechanical working, followed by a second phase of mechanical working at temperatures of less than 110° C. This phase makes it possible the introduction of the vulcanization system.

The first phase was carried out using a mixing device, of internal mixer type, of Brabender brand (capacity of 380 ml). The filling coefficient was 0.6. The initial temperature and the speed of the rotors were set on each occasion so as to achieve mixture dropping temperatures of approximately 140-160° C.

During the first phase it was possible to incorporate, in a first pass, the elastomers and then the reinforcing filler (introduction in instalments) with the coupling agent and the stearic acid. For this pass, the duration was between 4 and 10 minutes.

After cooling the mixture (to a temperature of less than 100° C.), a second pass made it possible to incorporate the zinc oxide and the protecting agents/antioxidant. The duration of this pass was between 2 and 5 minutes.

After cooling the mixture (to a temperature of less than 100° C.), the vulcanization system (sulfur and accelerators, such as CBS) was added to the mixture. The second phase was carried out in an open mill, preheated to 50° C. The duration of this phase was between 2 and 6 minutes.

Each final mixture was subsequently calendered in the form of plaques with a thickness of 2-3 mm.

TABLE I

| Composition | Example 2 | Comparative Ex. 2 |
|---|---|---|
| SBR | 103.0 | 103.0 |
| BR | 25.0 | 25.0 |
| S1 | 80.0 | |
| CS1 | | 80.0 |
| Coupling agent | 6.4 | 6.4 |
| Plasticizer | 7.0 | 7.0 |
| Carbon black (N330) | 3.0 | 3.0 |
| ZnO | 2.5 | 2.5 |
| Stearic acid | 2.0 | 2.0 |
| Antioxidant | 1.9 | 1.9 |
| DPG | 1.5 | 1.5 |
| CBS | 2.0 | 2.0 |
| Sulphur | 1.1 | 1.1 |

Subsequently, the mechanical and dynamic properties of the mixtures vulcanized at the curing optimum (T98) were measured according to the following procedures.

Rheological Properties

Viscosity of the Raw Mixtures

The Mooney viscosity was measured on the compositions in the raw state at 100° C. using an MV 2000 rheometer. Mooney stress-relaxation rate was according to the standard NF ISO 289.

The value of the torque, read at the end of 4 minutes after preheating for one minute (Mooney Large (1+4)—at 100° C.), is shown in Table II. The test was carried out on the raw mixtures after aging for 10 days and 3 weeks at a temperature of 23+/−3° C.

TABLE II

| Compositions | | Example 2 | Comp. Example 2 |
|---|---|---|---|
| ML (1 + 4) - 100° C. | Initial | 76 | 83 |
| Mooney relaxation | Initial | 0.323 | 0.309 |
| ML (1 + 4) - 100° C. | After 10 days (23 +/− 3° C.) | 79 | 85 |
| Mooney relaxation | After 10 days (23 +/− 3° C.) | 0.317 | 0.307 |
| ML (1 + 4) - 100° C. | After 3 weeks (23 +/− 3° C.) | 81 | 86 |
| Mooney relaxation | After 3 weeks (23 +/− 3° C.) | 0.299 | 0.301 |

It was found that compositions comprising the precipitated silica S1 of the present invention (Example 1) have a reduced initial raw viscosity with respect to compositions comprising a precipitated silica of the prior art. The reduced viscosity of the compositions comprising the inventive precipitated silica S1 with respect to reference compositions is maintained even after ageing.

Procedure for Rheometry Testing

The measurements were carried out on the compositions in the raw state. Rheology testing was carried out at 160° C. using a Monsanto ODR rheometer according to standard NF ISO 3417. According to this test, the test composition was placed in the test chamber (completely filling the chamber) regulated at the temperature of 160° C. for 30 minutes, and the resistive torque opposed by the composition to a low-amplitude (3°) oscillation of a biconical rotor included in the test chamber is measured.

The following parameters were determined from the curve of variation in the torque as a function of time:

the minimum torque (Tmin), which reflects the viscosity of the composition at the temperature under consideration;

the maximum torque (Tmax);

the delta torque ($\Delta T = T_{max} - T_{min}$), which reflects the degree of crosslinking brought about by the action of the crosslinking system and, when needed, of the coupling agents;

the time T98 necessary to obtain a degree of vulcanization corresponding to 98% of complete vulcanization (this time is taken as vulcanization optimum); and the scorch time TS2, corresponding to the time which is required increase the torque of 2 points above the minimum torque at the temperature under consideration (160° C.) and which reflects the time during which it is possible to process the raw mixture at this temperature without having initiation of vulcanization.

The results obtained for the compositions of Example 2 and comparative Example 1 are shown in Table III.

TABLE III

| | Example 2 | Comparative Example 2 |
|---|---|---|
| Tmin (dN · m) | 16.0 | 18.0 |
| Tmax (dN · m) | 59.0 | 50.6 |
| Delta torque (dN · m) | 42.9 | 32.7 |
| TS2 (min) | 6.2 | 6.0 |
| T98 (min) | 26.5 | 28.2 |

It was found that the composition according to the invention (Example 2) exhibits a satisfactory combination of rheological properties.

In particular, while having a reduced raw viscosity, it showed a lower minimum torque value and a higher maximum torque value than those of the reference composition, which reflects a greater processability of the composition.

The use of the silica S1 of the present invention (Example 2) thus makes it possible to reduce the minimum viscosity (lower minimum torque Tmin, which is a sign of an improvement in the raw viscosity) with respect to the reference compositions without damaging the vulcanization behavior.

Mechanical Properties of the Vulcanisates

The measurements were carried out on the optimally vulcanized compositions (T98) obtained at a temperature of 160° C.

Uniaxial tensile tests are carried out in accordance with standard NF ISO 37 with test specimens of H2 type at a rate of 500 mm/min on an Instron 5564 device. The x % moduli, corresponding to the stress measured at x % of tensile strain, were expressed in MPa.

A reinforcing index (RI) was determined which is equal to the ratio of the modulus at 300% strain to the modulus at 100% strain.

The Shore A hardness measurement on the vulcanisates was carried out according to standard ASTM D 2240, using a measurement time of 15 seconds. The properties are reported in table IV.

TABLE IV

| Compositions | Example 2 | Comparative Example 2 |
|---|---|---|
| 10% Modulus (MPa) | 0.5 | 0.6 |
| 100% Modulus (MPa) | 2.0 | 2.1 |
| 300% Modulus (MPa) | 11.0 | 9.7 |
| RI | 5.5 | 4.6 |
| Shore A hardness - 15 s (pts) | 56 | 57 |

It was found that the composition comprising the silica of the invention (Example 2) exhibits a good compromise in mechanical properties, with respect to what is obtained with the reference composition.

The composition of Example 2 showed relatively low moduli at 10% and 100% strain and a high 300% modulus, hence a greater reinforcing index.

The use of a precipitated silica of the invention (Example 2) makes it possible to obtain a satisfactory level of reinforcement, with respect to the control mixture.

Determination of the Dynamic Properties of the Vulcanisates

The dynamic properties were measured on a viscosity analyser (Metravib VA3000) according to standard ASTM D5992.

The values for loss factor (tan δ) and compressive dynamic complex modulus (E*) were recorded on vulcanized samples (cylindrical test specimen with a cross section of 95 mm² and a height of 14 mm). The sample ws subjected at the start to a 10% prestrain and then to a sinusoidal strain in alternating compression of plus or minus 2%. The measurements were carried out at 60° C. and at a frequency of 10 Hz.

Compressive complex modulus (E*, 60° C., 10 Hz) and loss factor (tan δ, 60° C., 10 Hz) were determined.

The values for the loss factor (tan δ) and for amplitude of the dynamic shear elastic modulus (ΔG') were recorded on vulcanized samples (parallelepipedal test specimen with a cross section of 8 mm² and a height of 7 mm). The sample was subjected to a double alternating sinusoidal shear strain at a temperature of 40° C. and at a frequency of 10 Hz. The strain amplitude sweeping cycles were carried out according to an outward-return cycle, proceeding outward from 0.1% to 50% and then returning from 50% to 0.1%.

The data obtained for the compositions of Example 2 and Comparative Example 2 are reported in Table V. They show the data of the return strain amplitude sweep and relate to the maximum value of the loss factor (tan δ max return, 40° C., 10 Hz) and to the amplitude of the elastic modulus (ΔG', 40° C., 10 Hz) between the values at 0.1% and 50% strain (Payne effect).

TABLE V

| Compositions | Example 2 | Comparative Example 2 |
| --- | --- | --- |
| E*, 60° C., 10 Hz (MPa) | 5.8 | 6.5 |
| Tan δ, 60° C., 10 Hz | 0.118 | 0.146 |

The use of a silica S1 of the present invention (Example 2) makes it possible to improve the maximum value of the loss factor at 60° C.

The data in Tables II to V show that compositions comprising the precipitated silica of the invention are characterized by a good compromise among processing, reinforcement and hysteresis properties, with respect to reference compositions, in particular with a gain in raw viscosity which remains substantially stable upon storage over time.

The invention claimed is:

1. A precipitated silica comprising a mixture of polycarboxylic acids comprising adipic acid, ethylsuccinic acid, and methylglutaric acid and having an aluminum content not exceeding 1500 ppm.

2. The precipitated silica according to claim 1, wherein the total content (C) of the mixture of polycarboxylic acids, expressed as total carbon, is at least 0.15% by weight.

3. The precipitated silica according to claim 1, wherein the precipitated silica has a BET specific surface of between 45 and 550 m²/g.

4. The precipitated silica according to claim 1, wherein the precipitated silica has a water uptake of at least 6.0%.

5. The precipitated silica according to claim 1, wherein the precipitated silica has a dispersive component of the surface energy $\gamma_s^d$ of less than 43 mJ/m².

6. The precipitated silica of claim 1, wherein the precipitated silica is obtained by a process comprising:
   reacting at least one silicate with at least one acidifying agent, to provide a silica suspension;
   submitting said silica suspension to filtration to provide a filter cake;
   submitting said filter cake to a liquefaction step, said liquefaction step being carried out in the absence of an aluminium compound, to obtain a suspension of precipitated silica; and
   optionally, drying the precipitated silica obtained after the liquefaction step;
   wherein the mixture of polycarboxylic acids comprising adipic acid, ethylsuccinic acid, and methylglutaric acid is added to the filter cake during or after the liquefaction step.

7. The precipitated silica according to claim 3, wherein the precipitated silica has a BET specific surface of between 70 and 370 m²/g.

8. The precipitated silica according to claim 3, wherein the precipitated silica has a BET specific surface of between 80 and 300 m²/g.

9. A process for the production of the precipitated silica of claim 1, the process comprising:
   reacting at least one silicate with at least one acidifying agent, to provide a silica suspension;
   submitting said silica suspension to filtration to provide a filter cake; submitting said filter cake to a liquefaction step, said liquefaction step being carried out in the absence of an aluminium compound, to obtain a suspension of precipitated silica; and optionally, drying the precipitated silica obtained after the liquefaction step;
   wherein a mixture of polycarboxylic acids comprising adipic acid, ethylsuccinic acid, and methylglutaric acid is added to the filter cake during or after the liquefaction step.

10. The process of claim 9, wherein the step of reacting at least one silicate with at least one acidifying agent comprises,
   (i) providing at least a portion of the total amount of the silicate involved in the reaction and an electrolyte in a vessel, the concentration of silicate (expressed as $SiO_2$) initially present in said vessel being less than 100 g/l;
   (ii) adding an amount of an acidifying agent to said vessel to obtain a pH value for the reaction medium of at least 7.0; and
   (iii) further adding an acidifying agent and, if appropriate, simultaneously the remaining amount of silicate to the reaction medium to obtain a silica suspension.

11. A method for reinforcing a polymer, the method comprising adding a precipitated silica of claim 1 to the polymer as a reinforcing filler.

12. A polymer composition comprising the precipitated silica of claim 1.

13. An article comprising at least one composition as claimed in claim 12.

14. The article of claim 13, wherein the article is a footwear sole, a floor covering, a gas barrier, a flame-retardant material, a roller for cableways, a seal for domestic electrical appliances, a seal for liquid or gas pipes, a braking system seal, a pipe, a sheathing, a cable, an engine support, a battery separator, a conveyor belt, a transmission belt or a tire.

16. The process of claim 10, wherein the concentration of electrolyte initially present in said vessel is less than 19 g/l.

16. The process of claim 10, wherein the acidifying agent is added to said vessel in (ii) in an amount effective to obtain a pH value for the reaction medium of between 7.0 and 8.5.

* * * * *